June 30, 1970   A. GASSER   3,517,543
APPARATUS FOR THE DETERMINATION OF HYDROGEN IN ALUMINUM MELTS
Filed Oct. 13, 1967   2 Sheets-Sheet 1

INVENTOR
ADOLF GASSER
BY
ATTORNEY.

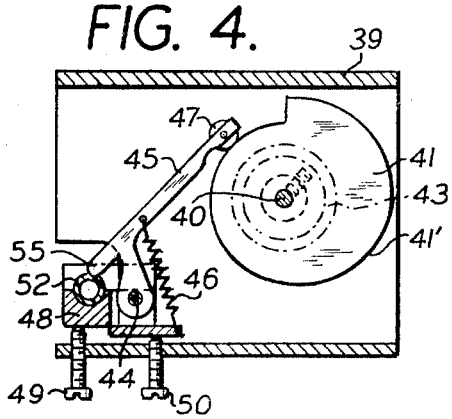
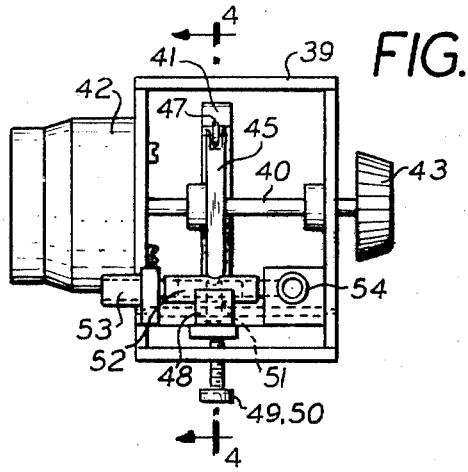
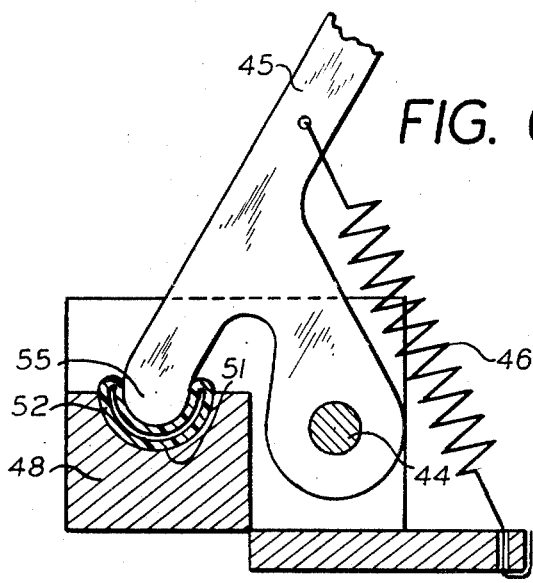

3,517,543
APPARATUS FOR THE DETERMINATION OF
HYDROGEN IN ALUMINUM MELTS
Adolf Gasser, Triesen, Liechtenstein, assignor to Feinmechanik-Anstalt, Schaan, Liechtenstein, a corporation of Liechtenstein
Filed Oct. 13, 1967, Ser. No. 675,197
Claims priority, application Austria, Oct. 14, 1966,
A 9,626/66
Int. Cl. G01n 7/14, 33/20
U.S. Cl. 73—19                           7 Claims

ABSTRACT OF THE DISCLOSURE

An apparatus for determining the hydrogen content in aluminum melts comprising a vacuum chamber, an electrical resistance-heated testing crucible disposed therein, an inspection window in the vacuum chamber, and a vacuum pump operatively connected to the vacuum chamber. A temperature measuring instrument and a vacuum meter are operatively connected with the vacuum chamber for indication of the temperature and of the pressure. A vacuum control member is operatively disposed between the vacuum pump and the vacuum chamber causing an automatic uniform pressure reduction, and means are provided for fixing a pointer, to indicate the prevailing pressure in the vacuum chamber at the instance upon observation through the inspection window of the first gas bubble on the surface of the melt.

---

The present invention relates to the determination of the hydrogen content in aluminum melts.

A survey of the hydrogen content in aluminum melts is of great importance in order to obtain parts of castings of uniform high-valued quality. A control of the liquid metal makes possible the application of suitable means for reduction of the gas content prior to pouring or casting thereof.

The determination of the hydrogen content is based on the basic findings developed by Y. Dardell, according to which the pressure is reduced by applying a vacuum above a metal sample maintained in its molten liquid state in a heated testing crucible to such a point, until the hydrogen emerges at a predetermined temperature at the surface of the melt in the form of bubbles. Upon appearance of the first ("real") bubble, which can be observed by means of an inspection window in a vacuum chamber containing the testing crucible, the pressure above and the temperature in the melt can be read on indicator instruments. During the formation of the first bubble, the gas pressure above the melt is equal to the pressure of the hydrogen in the metal itself. In accordance with the law of Sieverts, the solubility of the hydrogen depends upon the temperature in the melt and upon the gas pressure thereabove, in accordance with the equation $$\left[\log S = 0.5 \cdot \log p - \frac{A}{T} + B\right]$$

wherein S stands for the solubility of the hydrogen $\phi$ in cm.$^3$/100 g. metal, $p$ stands for the pressure in mm. Hg, T stands for the temperature in °K., and A and B are constants, which are different depending upon the composition of the aluminum alloy.

In practice, it is possible to determine by means of the established temperature- and pressure-values by means of nomograms and with a nomogram slide, respectively, the hydrogen content of the melt in a simple manner.

It is one object of the present invention to provide an apparatus for the determination of the hydrogen content in aluminum melts, which includes a vacuum chamber consisting of two halves, in the lower half of which is disposed an electrically resistance-heated testing crucible receiving the aluminum sample, and in the upper half of which an inspection window is provided for the observation of the surface of the sample, as well as of a submerged thermocouple extending into the melt, and a connection or branch for a vacuum pump, whereby, for the indication of the temperature as well as of the pressure, during the rise of the first gas bubble on the surface of the sample of the melt, a temperature measuring instrument, as well as a vacuum meter is disposed. The known devices of this type have the drawback, that their manipulation is very cumbersome and that by the required simultaneous observation of the rising bubble in the testing crucible of the vacuum chamber and of the pressure- and temperature-indication, erroneous determinations of the hydrogen content are unavoidable. The manipulation of the apparatus is additionally also made more difficult by the fact, that during the bleeding of the vacuum chamber, simultaneously a control valve must be operated, in order to set on the vacuum meter a most probable uniform reduction of the pressure of about 5–10 torr/sec. A further drawback, which leads to erroneous determinations of the hydrogen content, resides in the fact, that the testing crucible has a temperature different from that of the melt, so that upon pouring of the melt into the crucible, heat is fed off or to the latter and thereby the temperature of the melt changes.

It is another object of the present invention to provide an apparatus for the determination of the hydrogen content in aluminum melts, which avoids the mentioned drawbacks and which resides substantially in an arrangement, according to which between the vacuum pump and the vacuum chamber, a vacuum control member is provided automatically causing in the vacuum chamber a uniform pressure reduction, so that the indicating movement of the vacuum meter indicator or pointer can be stopped by means of a push button or the like, by means of a measuring valve, in order to retain at the moment of emerging of the first gas bubble on the surface of the sample melt the pressure prevailing in the vacuum chamber, and that a thermocouple is connected to the wall of the testing crucible in the same manner as the submerged thermocouple, by means of a potentiometer over a two way switch with the temperature measuring instrument.

By this structure of the apparatus, its operation is appreciably simplified, since the operator must merely concentrate on observation of the bubble rise in the testing crucible and, at this moment, he can read without any difficulties the prevailing pressure in the vacuum container by operation of the push button for holding the pointer of the vacuum meter. By the thermocouple joined to the testing crucible, the temperature on the temperature measuring instrument is equal to that of the melt in the crucible, depending upon the position of the two way switch, whereby the submerged thermocouple, as well as the thermocouple joined to the crucible wall can be calibrated in relation to the temperature indicating instrument by means of the potentiometers (calibration resistances) which are provided. A particular operation of a control valve for the uniform pressure reduction in the vacuum chamber is avoided by the vacuum control that is provided.

It is another object of the present invention to provide an apparatus for the determination of the hydrogen content in aluminum melts, wherein the vacuum control member comprises an elastic piece of hose inserted into the vacuum conduit and maintained in a stretched position. The piece of hose is supported by a bearing member having a groove-like recess. Within the range of the bearing member a pivotable finger pressing towards the free hose wall, which finger is disposed by means of a control member driven in dependency upon a short duration clock mechanism, the control face of the control member jointly with the form of the finger causing a uniform pressure reduction in the vacuum chamber, upon operation of a switching knob for the common operation of the short duration clock mechanism and of the vacuum pump due to the automatic change of the passing cross-section of the piece of hose. The switching member comprises, in a preferred structure, a switching disc having a spirally shaped outer face, which switching disc is disposed on the shaft of the switching knob for joint operation of the short duration clock mechanism and of the vacuum pump and against which outer face a roller of the finger engages under the effect of a pull spring. By this arrangement of the vacuum control member and the relationship caused by this structure, which changes continuously the cross-section of the hose member in dependency upon the time, the evacuation process is influenced relatively such, that it brings about the mentioned constant uniform pressure reduction in the vacuum chamber.

In accordance with a particular embodiment of the present invention, an electro mechanical valve is disposed between the vacuum chamber and the vacuum meter and is operable by the push button for holding the pointer of the vacuum meter and a bleeder valve is disposed between the vacuum chamber and the vacuum control member which is electrically operable by another push button. In accordance with the present invention, a control transformer for setting the heat output is disposed in the current feed of the resistance-heated testing crucible for adaptation of its temperature to that of the sample melt, whereby for the examination of the current fed to the resistance-heated testing crucible an ampere meter is provided. In this manner, the temperature of the testing crucible can be set equally with that of the melt, so that during pouring of the sample melt into the testing crucible, no additional heat loss or heat addition can occur.

With these and other objects in view which will become apparent in the following detailed description, the present invention will be clearly understood in connection with the accompanying drawings, in which:

FIGS. 1 and 2 are a front elevation and a side elevation showing schematically an apparatus for the determination of the hydrogen content in aluminum melts in accordance with the present invention;

FIG. 3 is a schematic showing, in a simplified manner, of the inner structure of the apparatus, whereby the dashed lines indicate the electrical connections to the respective release-, control- and indicating-instruments, the dashed-dotted lines, the connections to the temperature indicators and the double connecting lines, the vacuum conduits between the vacuum pump and the vacuum chamber of the testing crucible and the members of the evacuation system arranged therebetween;

FIG. 4 is a section along the lines 4—4 of FIG. 5;

FIG. 5 is an end view of the apparatus discolsed in FIG. 4; and

FIG. 6 is a fragmentary section of a particular part of the apparatus.

Figure 1:
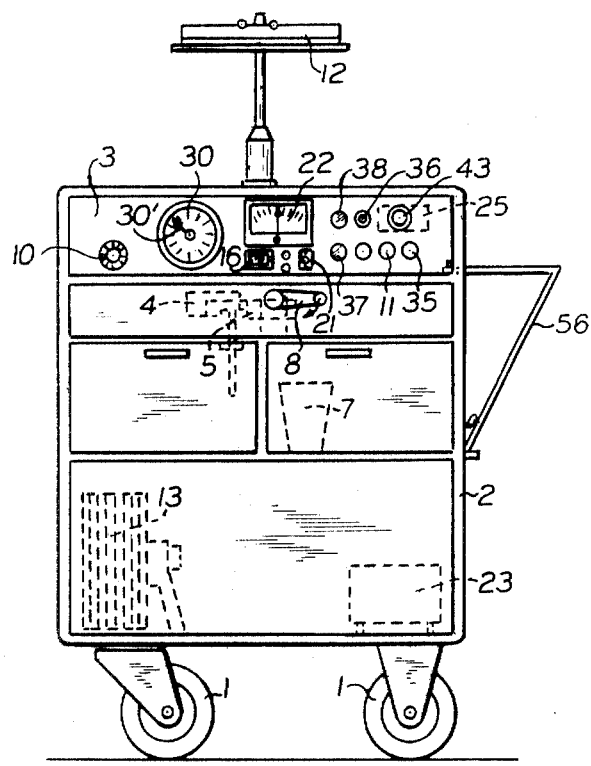
Figure 2:
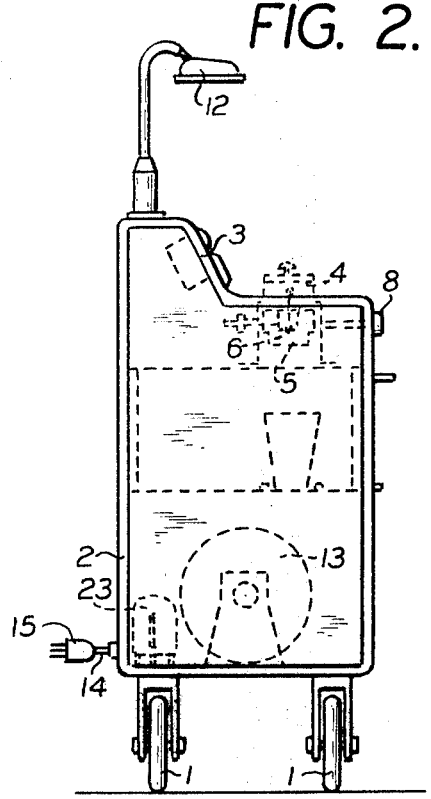
Figure 3:
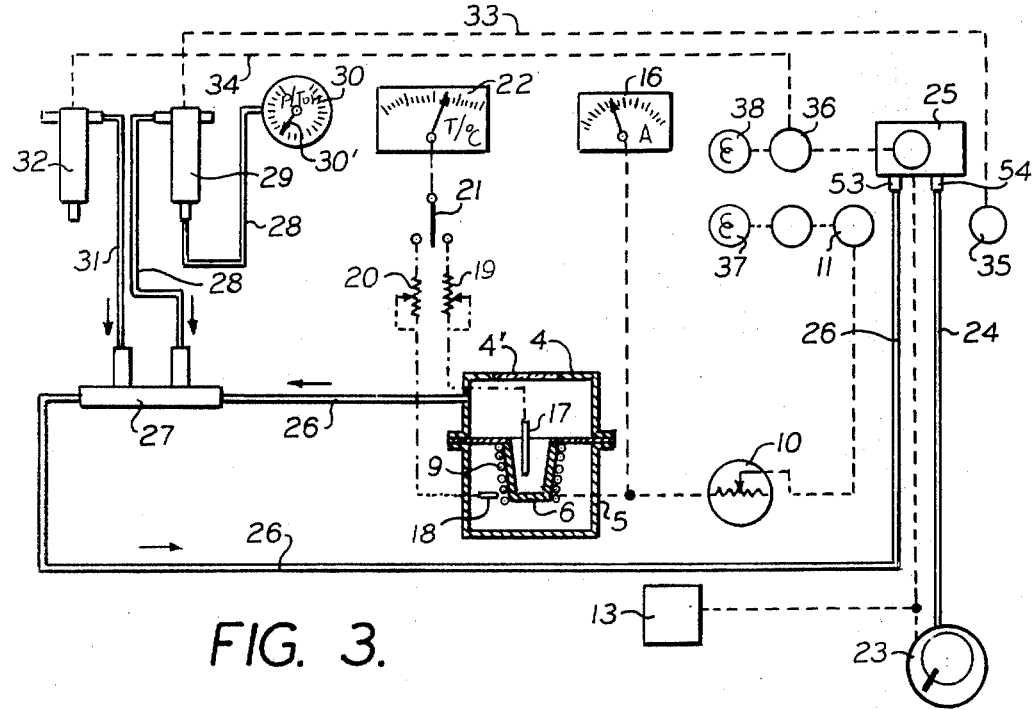

Referring now to the drawings, and in particular to FIGS. 1–3, the apparatus comprises a frame 2, equipped for rolling on wheels 1, for reception of all parts of the apparatus, and a desk 3, on which the release, control and indicating instruments of the apparatus, more clearly described below, are arranged as an armature board. A vacuum chamber consisting of two halves 4 and 5 together with a testing crucible 6 receiving the aluminum sample is provided in front of the desk 3 in the carriage frame 2 (FIG. 3). The lower part 5 of the vacuum chamber, contains an electrically resistance-heated testing crucible 6, and is mounted for tilting movement by a handle 8, for removing the sample melt into a graphite crucible 7 disposed therebelow in the carriage frame 2. The upper part 4 of the vacuum chamber is covered by an inspection window 4', so that the surface of the aluminum sample can be observed in the testing crucible 6. For observation of the bubble rise in the testing crucible 6, a light 12 is provided on the desk 3, which light 12 makes possible, independent of the position of the apparatus in a shop, the determination of the bubble rise and simultaneously also the examination of the pressure- and temperature-indications. The heat output of the resistance heating element 9 (FIG. 3) of the testing crucible 6 can be controlled by means of a control transformer 10 and can be connected by means of a push button 11 to the network. A return table roller 13 for a current supply cable 14 is provided in the carriage frame 2, in order to make possible the setting of the apparatus with plug 15 independent upon the location of the plug connection in the shop hall at a suitable place. An ampere meter 16 for indication of the current fed thereto is disposed in the circuit for the heating element 9. A submerged thermocouple 17 extends into the melt contained in the examination crucible 6 and a thermocouple 18 extends to the wall of the testing crucible 6. Both thermocouples 17 and 18 are each connected by means of a potentiometer 19 and 20, respectively, over a two-way switch 21 with a temperature measuring instrument 22. Furthermore, a vacuum pump 23 is provided in the carriage frame 22, which vacuum pump 23 is connected with a vacuum control member 25 by means of a hose conduit 24. The vacuum control member 25 is connected with the upper portion 4 of the vacuum meter is connected to the divider member 27 by means of a hose whereby to the latter is connected a vacuum meter by means of a hose conduit 28 and an intermediate arrangement of a measuring valve 29, and a bleeder valve 32 by means of a hose conduit 31. The measuring valve 29 and the bleeder valve 32 are formed as electro-mechanical valves and are operable by means of current feeds 33 and 34, respectively, operated by means of push buttons 35 and 36, respectively. Control lamps 37 and 38 indicate the operation of the push buttons 35 and 36, respectively. The vacuum control member 25 automatically causes by its structure a uniform pressure reduction. Upon operation of the push buttons 35, the measuring valve 29 is closed, whereby the indicator or pointer 30' of the vacuum meter 30 stops instantly.

Referring now to the drawings, and more particularly to FIGS. 4–6, the vacuum control member 25, causing automatically a uniform pressure reduction in the vacuum chamber 4, 5, comprises a housing 39, on which is mounted a shaft 40 with a control means of switching disc 41 rigidly secured thereto, which switching disc 41 is designed as a cam having a spirally shaped end face 41' and is operatively connected with a short duration measuring instrument 42, the clock mechanism of which has a running time of 60 seconds over a rotary angle of the shaft 40 by means of a switching knob 43 of about 300°. During operation of the switching knob 43 the clock mechanism starts and switches on simultaneously the vacuum pump 23 by means of an electric lever key switch (not shown) and built in the short duration measuring instrument 42. A lever arm 45 is swingably mounted in the housing 39 about a bearing bolt 44, which lever arm 45 by means of the effect of a tensioned spring 46 is pulled so that a roller 47 mounted at the end of the lever arm presses against the end face 41' of the switching disc 41. A bearing member 48 is pivotally positioned about the bearing bolt 44, the pivoting range of which is adjustable by set screws 49 and 50 disposed on both sides of the bearing bolt 44 and which has a bearing groove 51 formed half-cylindrically for the reception of a hose member 52, which is mounted with its ends each on a hose socket of two connecting members 53 and 54 secured to the housing 39.

The lever arm 45 has a finger 55 directed towards the hose member 52, the end of the finger 15 being rounded out and upon swinging of the lever arm 45 by movement of the spiral-shaped end face 41' of the switching disc 41, the hose member 52 is pressed together to assume a crescent-like shaped cross-section, as it is apparent in FIG. 6, whereby the desired cross-section reduction of the vacuum conduit is brought about. This causes automatically a uniform pressure reduction. A hose conduit 26 (FIG. 3) leads from the connecting branch 53 through the distributor member 27 to the vacuum chamber 4, 5 and a hose conduit 24 leads from the connection branch 54 to the vacuum pump 23. By adjusting the bearing member 48 by means of the set screws 49 and 50, a fine adjusting of the pressure reduction by the vacuum control is brought about. On the side wall of the carriage frame 2 is disposed a laterally tiltable writing desk 56 on which a monogram slide is provided, with which the hydrogen content of the melt can comfortably be read rapidly upon setting of the material constant (G-value) as the cutting point of a connecting line between the measured pressure- and temperature-values on a monogram.

The opeartion of the apparatus for the observation and determination of the hydrogen content in aluminum melts which is of greatest importance for the achievement of an equally high valued quality is as follows:

Upon connection of the apparatus by means of the plug 15 to the current supply, the resistance heating element 9 of the open testing crucible 6 is operatively connected by pressing the push-button 11, whereby the adjacent control lamp 37 lights up. By means of the control transformer 10 the heating current is set at 7.5 amps and the current indicator is examined on the ampere meter 16. For the indication of the temperature of the testing crucible 6, the two way switch 21 is set from its center position, as shown in FIG. 1 downwardly, so that the potentiometer 20 becomes effective as an adjustment resistance for the thermocouple 18 and the prevailing temperature of the testing crucible 6 can be read on the temperature measuring device 22. Upon reaching the desired temperature, which should correspond to that of the melt to be tested in the testing crucible, so that upon pouring in the sample melt no heat escape or heat addition occurs, the upper portion 4 of the vacuum chamber is mounted on the lower portion 5 thereof, and thereafter the heating output of the resistance heating element 9 is reduced to such an extent until the desired constant temperature of the testing crucible 6 is indicated on the temperature measuring device 22. Thereafter the switching knob 43 of the vacuum control member 25 is turned clockwise (FIG. 4) up to an abutment limiting the rotating angle of 300° of the shaft 40, and simultaneously the vacuum pump 23 by operation of the lever key switch provided in the short duration meter 42, becomes connected to the power supply line, whereby the control lamp 38 lights up and the vacuum pump operates. By means of the vacuum pump 23 the entire system is evacuated by means of the vacuum control member, which guarantees in the evacuation range of 200 to 20 torr. a constant suction speed of 5 torr./sec., and thereby the required uniform pressure reduction in the vacuum chamber 4, 5 is assured. Upon turning switching knob 43, the switching disc 41 is turned clockwise from the position FIG. 4, so that due to its end face 41', the lever arm 45 is swung counter-clockwise about the bearing bolt 44 and its finger 55 thereby presses together the hose member 52 into the cross-section shape indicated in FIG. 6 of the drawings. The clock mechanism then rotates the switching disc 41 back to its original position and during this period the compressed hose member 52 gradually increases its cross-section causing the uniform pressure reduction in the vacuum chamber. After the terminated control within the time limit of 60 seconds determined by the short duration clock mechanism 42, the hose member 52 expands by itself (as the finger 55 is raised) and assumes again its full non-compressed circular cross section. In FIG. 3, the position of the vacuum control member 25 shortly prior to reaching its starting position is apparent. During the test process, the operator can merely observe the surface of the melt in the testing crucible, and upon appearance of the first "real" bubble, he presses down the push button 35, so that the measuring valve 29 is operated by the electrical connection 33 and the pointer 30' of the vacuum meter 30 is stopped momentarily. Thus, the exact pressure which prevailed during the rise of the bubble can be set. Thereafter, the hydrogen content of the melt can be determined in the above-stated manner as a section point of a connecting line between the read pressure—and temperature—values on the nomogram slide attached to the apparatus of the desk base 55. After a test has been completed, in order to open the vacuum chamber valves 4, 5 then under the effect of a vacuum, the button 36 is pressed and the bleeder valve 32 floods the vacuum chamber with air raising the pressure therein so that the vacuum chamber may be opened, and the hose assumes again completely its original shape. After the flooding of the vacuum chamber with air, it is to be observed that the pointer 30' of the vacuum meter again obtains its original position.

Summarily, it can be stated that the apparatus, designed in accordance with the present invention, has the advantage in comparison with the known devices, that the operator merely has to concentrate on the bubble rise in the testing crucible for the determination of the hydrogen content in the aluminum melt and to the pressure indication by operation of the measuring push button 35. The locking of the pointer 30' of the vacuum meter 30 takes place independently from the bubble rise and the evacuation of the vacuum chamber 4, 5 at a uniform pressure reduction of about 5–10 torr./sec. without a manual control occurs automatically. The exactness of the determination of the hydrogen content is increased by the fact, that the heat output on the tesing crucible is conrollable in order to be able to set the temperature necessary for the melt and error determinations by heat addition or heat loss of the melt on the testing crucible are eliminated.

While I have disclosed one embodiment of the present invention, it is to be understood that this embodiment is given by example only and not in a limiting sense, the scope of the present invention being determined by the objects and the claims.

I claim:

1. An apparatus for the determination of the hydrogen content in aluminum melts, comprising an upper chamber portion and a lower chamber portion together constituting therein a vacuum chamber, an electrical resistance-heated testing crucible disposed in said lower chamber portion, and adapted to receive therein an aluminum melt sample containing hydrogen, an inspection window disposed in said upper chamber portion, such that the surrface of an aluminum melt sample in said crucible can be seen therethrough, a first thermocouple extending from said upper chamber portion, into said crucible, a vacuum pump, a branch conduit emerging from said upper chamber portion and operatively communicating with said vacuum chamber and communicating with said vacuum pump, respectively a temperature measuring means operatively connected with said crucible for indication of the temperature thereof, a vacuum meter means operatively connected with said vacuum chamber for indication of the pressure thereof, a vacuum control means operatively disposed between said vacuum pump and said vacuum chamber and for causing an automatic uniform pressure reduction in said vacuum chamber, thereby causing a first hydrogen gas bubble to rise to the surface of the aluminum melt sample in said crucible, said vacuum meter means including a pointer, a push button and a valve operatively connected to each other and with said vacuum meter means, said valve operatively communicating with said vacuum chamber, such that said pointer of said vacuum meter means is held in its place upon operation of said push button by means of said valve, in order to indicate the prevailing pressure in said vacuum chamber at the instance of emergence of the first hydrogen gas bubble on the surface of said aluminum melt sample, said testing crucible having a wall, a second thermocouple operatively connected to said wall of said testing crucible, two potentiometers, each of said thermocouples being operatively connected with one of said potentiometers, and a two way switch selectively connecting said temperature measuring means with one said potentiometers for alternate operative connection of said temperature measuring means with said first and second thermocouples, respectively.

2. The apparatus, as set forth in claim 1, which includes a vacuum conduit connecting said vacuum pump with said branch conduit via said vacuum control means, said vacuum control means comprises a housing and an elastic hose member inserted in said housing and maintained in stretched position therein, a bearing member connected to said housing and having a groove-like recess receiving said hose member, a finger having a predetermined configuration and pivotably connected to said housing, swinging within the range of said recess and pressing against said hose member, a short duration clock means, a control means having a control face and driven by said clock means, said finger being operable by said control means when the latter is driven by said clock means, a switching knob for the joint operation of said clock means and said vacuum pump, and said control face of said control means jointly with said configuration of said finger causing an automatic variation of the cross-section of said elastic hose member upon operation of said switching knob, and in turn bringing about an uniform pressure reduction in said vacuum chamber.

3. The apparatus, as set forth in claim 2, wherein said control means comprises a switching disc having a spiral-shaped end face constituting said control face, a shaft mounted in said housing and carrying said switching knob, said switching disc is keyed to said shaft, a doubled armed lever pivotally mounted in said bearing member and carrying said finger at one end and having a roller at its other end, and resilient means urging said roller into engagement with said spiral-shaped end face of said switching disc.

4. The apparatus, as set forth in claim 1, wherein said valve comprises an electromechanical valve and is disposed between and in connection with said vacuum chamber and said vacuum meter means, and is operable by said push button.

5. The apparatus, as set forth in claim 1, which includes an electrically operable bleeder valve means operatively communicating with said vacuum chamber, and a second push button electrically connected to said bleeder valve means as well as to said vacuum control means.

6. The apparatus, as set forth in claim 1, wherein current feed means for heating said testing crucible, and which includes a control transformer for setting the heat output for said testing crucible for controlling the temperature of said testing crucible to equal that of said melt sample.

7. The apparatus, as set forth in claim 6, which includes an ampere meter connected to said current feed means.

References Cited

UNITED STATES PATENTS 2,303,655  12/1942  Nutter _____ 73—19
3,293,902  12/1966  Kraus _____ 73—19

FOREIGN PATENTS 932,994  9/1955  Germany.

RICHARD C. QUEISSER, Primary Examiner

C. E. SNEE III, Assistant Examiner